United States Patent [19]

Theis et al.

[11] 4,439,635

[45] Mar. 27, 1984

[54] MESSAGE DELIVERY SYSTEM

[75] Inventors: Peter F. Theis, 3203 Bay View La., McHenry, Ill. 60050; Gregory Buchberger, Mount Prospect, Ill.

[73] Assignee: Peter F. Theis, Gurnee, Ill.

[21] Appl. No.: 347,293

[22] Filed: Feb. 9, 1982

[51] Int. Cl.³ .............................................. H04M 1/64
[52] U.S. Cl. .................................... 179/6.2; 179/6.17; 179/6.03; 360/12
[58] Field of Search ...................... 179/6.2, 6.17, 6.06, 179/6.05, 6.04, 6.03, 6.02; 360/31, 74.1, 12; 369/2, 53, 58

[56] References Cited

U.S. PATENT DOCUMENTS

| | | | |
|---|---|---|---|
| 3,295,853 | 1/1967 | Cheng | 369/2 |
| 3,496,299 | 2/1970 | Femmer | 179/6.05 |
| 3,553,378 | 1/1971 | Alter | 179/6.17 |
| 3,974,338 | 8/1976 | Luzier | 369/2 |
| 4,011,586 | 3/1977 | Pastor | 360/31 |
| 4,150,405 | 4/1979 | Sato | 360/74.1 |
| 4,219,702 | 8/1980 | Smith | 360/31 |

*Primary Examiner*—Alan Faber
*Attorney, Agent, or Firm*—Willian, Brinks, Olds, Hofer, Gilson & Lione, Ltd.

[57] ABSTRACT

A message delivery system is described which includes a plurality of announce units, each of which includes means for storing a respective message segment. A controller activates selected ones of the announce units in sequence in order to broadcast a message made up of a plurality of message segments to a number of line interface units. Each of the line interface units is connected to a respective telephone line and acts to transmit the message to the associated telephone line. The controller activates selected ones of the announce units which store selected message segments in a predetermined sequence such that a total message made up of a number of separate segments is broadcast to the line interface units. Each message segment is recorded with an end of segment signal which is detected by the announce unit at the end of the respective segment. Each announce unit generates an end of segment signal which is used by the controller in order automatically to sequence the announce units in the proper order. Because the message is divided into a plurality of segments, it is possible to change only one segment without disturbing other portions of the message. Furthermore, if any single announce unit fails, remaining announce units continue to deliver remaining portions of the message. In this way the disclosed message delivery system continues to operate at reduced capacity in the event of failure of one or more of the announce units.

16 Claims, 5 Drawing Figures

MESSAGE DELIVERY SYSTEM

BACKGROUND OF THE INVENTION

The present invention relates to an improved message delivery system for delivering a prerecorded message to a number of telephone lines simultaneously.

Recording units are currently used to broadcast a message stored on a single recording medium simultaneously to multiple callers over multiple telephone lines. In one type of device currently used for this purpose, a magnetic tape cartridge or a solid state memory is used to store a message which is repeatedly broadcast. Commonly available devices of this type provide a number of important disadvantages. First, when any portion of such a message is to be changed, the entire message must be prepared again. Second, when continuous loop cartridges are used, the maximum message length is limited to the recording capacity of a single cartridge, and the length of the message must equal the loop time of the continuous loop cartridge if time is not to be lost while the cartridge advances from the end of the message to the start of the message on the same loop.

Another disadvantage of such devices is that a failure such as breakage of a continuous tape loop tends to produce a dramatic degradation in system performance. For example, a broadcasting device which utilizes only a single continuous loop cartridge can fail altogether if that cartridge fails.

The present invention is directed to an improved message delivery system which to a large extent overcomes these and other disadvantages of message delivery systems of the type described above.

SUMMARY OF THE INVENTION

According to this invention, a message delivery system is provided for delivering an audio message to a plurality of line interface units, each of which is coupled to a respective telephone line, in order simultaneously to broadcast the same message to each of the interface units. The system of this invention includes a number of separate message playback units. Each of these playback units is used to store and play back a respective message segment. The playback units are controlled by a controller which acts to activate selected ones of the playback units sequentially such that the cycle of separate message segments is broadcast to the line interface units in the proper sequence. Preferably, each of the playback units is designed such that the message segment stored in an individual playback unit may be changed without disturbing the message segments stored in other playback units.

In use, the controller of this invention operates to play back the message segments of a subset of the total number of playback units in sequence, thereby generating the entire intended message. Playback units which are not included in the currently active subset can be used to modify or alter the message segments recorded therein. Then, when it is desired to alter a portion of the message being broadcast to the line interface units, a playback unit having a newly modified message segment can be substituted for the playback unit having the message segment that is to be replaced.

As will be seen from the following detailed description, the present invention provides a number of important advantages. It allows message segments to be changed readily and easily, without interruption of the delivery of the message to the interface units. Furthermore, a portion of the message can be changed without disturbing remaining portions of the message. In the event that one of the playback units should fail (as for example by the failure of the respective recording medium) the system will continue to broadcast remaining portions of the message. Thus, failure of an individual playback unit does not entirely disrupt operation of the system. Moreover, the duration of the total message can be set flexibly at a wide range of desired values. The message length can be much longer than that possible with only a single playback unit of a given type, and constraints related to the time needed to advance a playback unit from the end of a message to the beginning of the message are much less severe.

The invention itself, together with further objects and attendant advantages, will best be understood by reference to the following detailed description taken in conjunction with the accompanying drawings.

BRIEF DESCRIPTION OF THE DRAWINGS

FIGS. 3 and 3a are a detailed schematic diagram of the controller of FIGS. 1 and 2a.

DETAILED DESCRIPTION OF THE PRESENTLY PREFERRED EMBODIMENT

Figure 1:
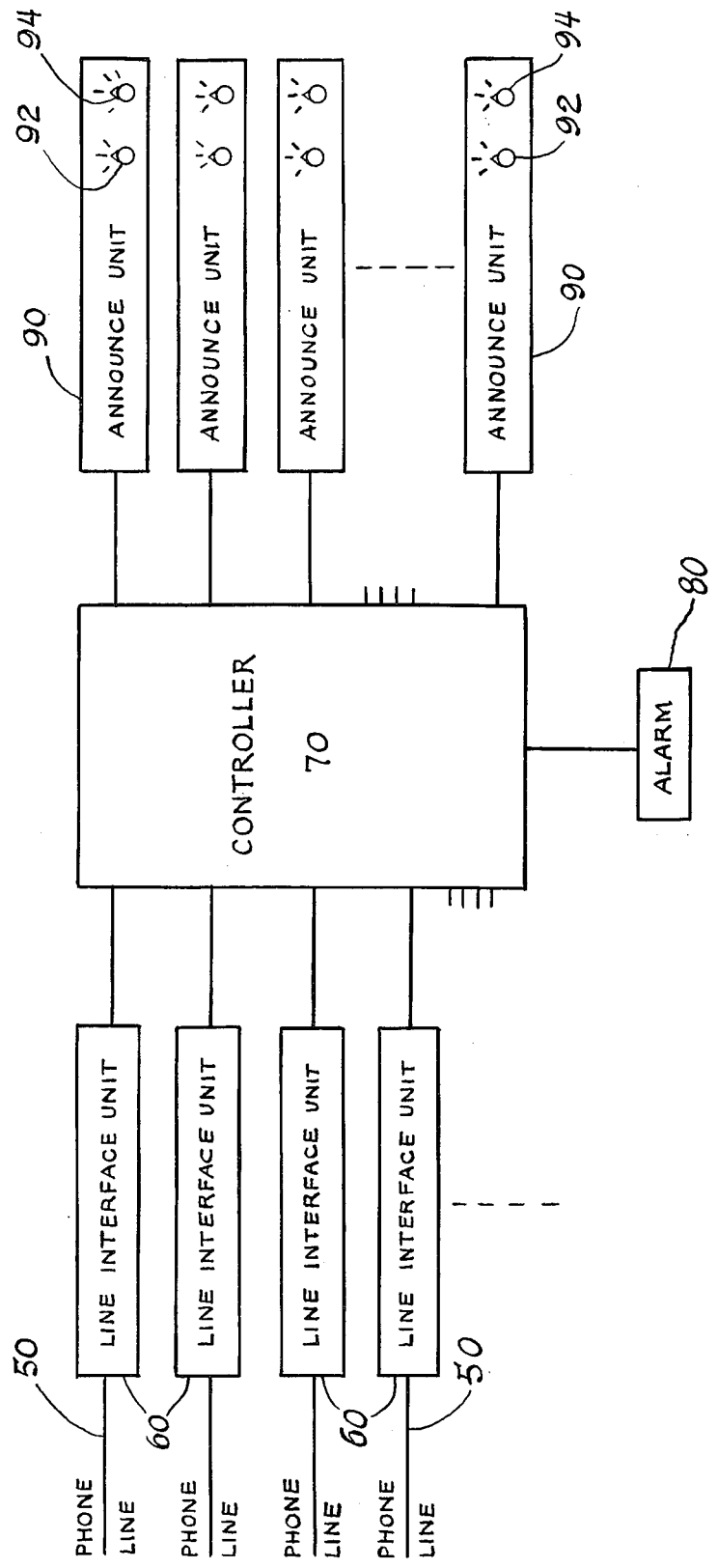
FIG. 1 is a block diagram of a presently preferred embodiment of this invention.

Turning now to the drawings, FIG. 1 shows a general block diagram of a message delivery system which incorporates a presently preferred embodiment of this invention. This delivery system is connected to a plurality of telephone lines 50. In FIG. 1, only four lines 50 are shown; however, it will be understood that the system of FIG. 1 can be made to operate with a much larger number of lines if desired.

Each of the lines 50 is connected to a respective line interface unit 60. Each of these interface units 60 acts as a voice connecting arrangement to respond to a ringing line, to seize the line, and to hold the line until commanded to drop it or until the line is dropped by the caller. The operation of these line interface units 60 will be explained in greater detail below in connection with FIG. 2b.

The system of FIG. 1 includes a number of individual announce units 90, each of which records a respective message segment and is coupled to a central controller 70. The controller 70 also acts to control an alarm 80, which in this preferred embodiment is an aural alarm. Each of the announce units 90 is in effect a playback unit. For example, each announce unit can include circuitry for generating an audio signal from a continuous loop magnetic tape cartridge. The detailed operation of the announce units 90 will be described below in connection with FIG. 2a. Here, it is enough to note that each of the units 90 is controlled by the controller 70 such that when activated by the controller 70, the unit 90 acts to generate an audio message segment by playing back the message-bearing portion of a continuous magnetic tape.

Each of the announce units 90 includes a three-position mode switch 92 which can be used to place the announce unit 90 in either the RECORD mode, the CHECK mode, or the READY mode. In the RECORD mode, the announce unit 90 can be used to record a message segment on the respective magnetic tape cartridge. In the CHECK mode, the announce unit 90 can be used to play back the recorded message segment to check its accuracy. In the READY mode, the announce unit 90 can be controlled by the controller 70 in order to play back the recorded message segment automatically. In addition, each of the announce units 90 includes an end of message switch 94. When the announce unit 90 is in the RECORD mode and the end of message switch 94 is depressed, an audio end of message signal is recorded on the magnetic tape. The use of this end of message signal will be explained below in connection with FIG. 2a. Suitable announce units can be purchased from Conversational Voice Terminal Corporation, Gurnee, Ill.

Figure 2A:
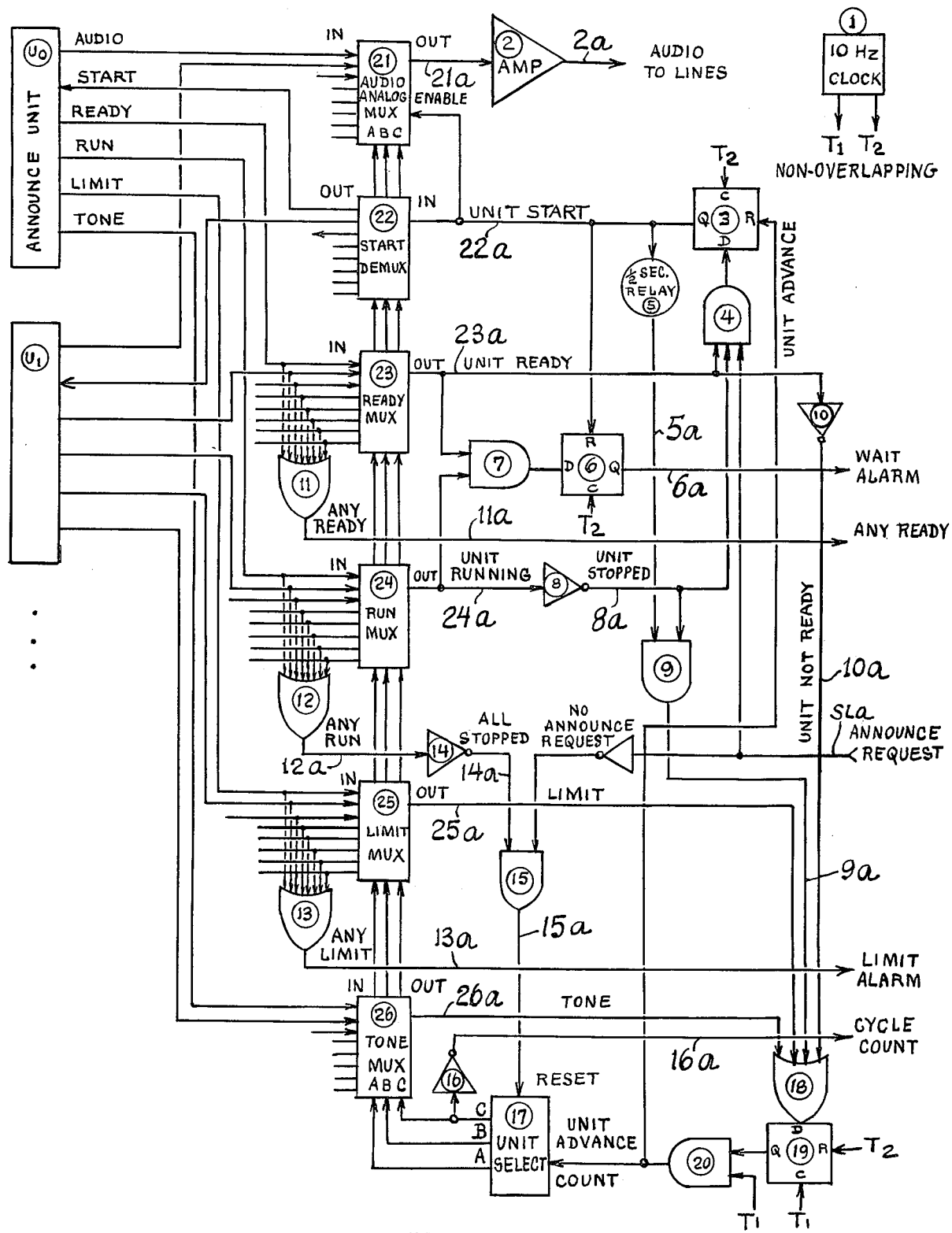
FIG. 2a is a more detailed block diagram of the controller of FIG. 1.

Turning now to FIG. 2a, each of the announce units 90 generates five output signals and is responsive to one input signal. The five output signals are labeled as follows in FIG. 2a: AUDIO, READY, RUN, LIMIT, TONE. The single input is labeled START in FIG. 2a. The following discussion will take up each of these six signals.

The AUDIO signal is the audio output of the announce unit 90. This AUDIO signal carries the message segment stored in the announce unit 90. It is the AUDIO signal which, when properly applied to the line interface unit 60, is heard by a caller via the phone line 50.

The START signal is a two-state digital input signal which, when present, causes the announce unit 90 to start the playback of the recorded message and the generation of the corresponding AUDIO signal on the audio output line.

The READY signal is a two-state digital signal which indicates the mode of operation of the announce unit 90. That is, the READY signal is in the true state when the announce unit is powered and in the READY mode, and the READY signal is in the false state when the announce unit is in either the RECORD or the CHECK modes of operation or is unpowered.

The RUN signal is also a two-state digital signal which is in the true state when the announce unit is running, playing back a message segment, and in the false state when the unit is stopped.

The LIMIT signal is a third two-state digital signal which is in the false state when the announce unit is operating properly, completing each cycle of playback of the endless loop magnetic tape in less than a predetermined time limit. However, if for any reason an announce unit 90 does not complete a playback cycle within this predetermined time limit, the LIMIT signal for that announce unit 90 is placed in the true state. In this preferred embodiment, the time required to run through a complete cycle of the endless magnetic tape is five minutes, and the predetermined time limit is six minutes. Thus, if any of the announce units 90 runs for more than six minutes without stopping, the LIMIT signal is set to the true state to indicate a failure of the respective announce unit 90.

The TONE signal is a fourth two-state digital signal which is controlled by the announce unit 90 to indicate when the announce unit 90 has sensed an audio end of segment tone on the tape. Whenever the announce unit 90 detects an end of segment tone, it sets the TONE signal to the true state for a period of three to five seconds, after which time it automatically resets the signal to the false state. As explained above, the end of segment switch 94 is used to record an audio tone at the end of the recorded segment on each of the magnetic tapes. When this end of segment tone is detected while the announce unit is running, the announce unit operates to set the tone signal to indicate detection of the end of segment tone for a brief period.

Each of the announce units 90 operates to cycle through one complete cycle of the endless tape once a START signal is received on the START input. The tape includes a metal foil at the end of tape position, and the announce unit 90 operates automatically to stop the unit once this end of tape metal foil is detected. Thus, for a five-minute tape, it will consistently require five minutes from the initiation of a START signal on the START input for the announce unit to cycle back to the point where it is ready to reinitiate playback of the recorded message segment.

FIG. 2a is a block diagram which describes in functional detail the manner of operation of the controller 70. The schematic diagram of FIG. 3 shows in much greater detail the exact manner in which the controller 70 is constructed. It should be understood that in order to more clearly present the functional operation of the controller 70 in FIG. 2a, a number of logic inversions have been deleted. In order to facilitate an understanding of the schematic of FIG. 3, identical reference numerals are used both in FIG. 2a and in FIGS. 3 and 3a. FIGS. 3 and 3a should be referenced for a detailed description of the exact structure of this preferred embodiment. However, the following discussion will deal with only FIGS. 2a and 2b for purposes of clarity.

Turning now to FIG. 2a, the controller 70 acts to control the separate announce units 90 so as to produce the desired sequence of message segments, which sequence is transmitted to each of the line interface units 60 to be broadcast on the respective telephone lines 50. The controller 70 includes six multiplexers 21, 22, 23, 24, 25, 26. Each is an eight to one multiplexer, and each includes three line select inputs A, B, C. The line select inputs A,B,C, of each of the multiplexers 21–26 are connected in parallel to respective output terminals A,B,C of a unit select counter 17. Thus, when the counter 17 is set to the binary number zero, each of the multiplexers 21–26 couples its input or output to the zero channel. The counter 17 operates to count sequentially from zero to seven and then cycle back to zero.

For example, when the counter 17 is in the binary state 1, the audio analog multiplexer 21 operates to pass the audio signal from the announce unit U1 via line 21a to an audio amplifier 2. The output of this audio amplifier 2 is connected via line 2a to each of the line interface units 60 for broadcast to the respective telephone lines 50. The audio multiplexer 21 is provided with an enable input which causes the audio signal to be transmitted to the amplifier 2 only when a START signal is present on line 22a.

The START demultiplexer 22 operates to pass the START signal on line 22a to the selected one of the eight announce units 90. As explained above, the announce units 90 are constructed such that a START signal on the respective START input will cause the announce unit to begin running, playing back the recorded message segment.

The READY multiplexer 23 operates to pass the READY signal from the selected one of the announce units 90 to the line 23a. In addition, the OR gate 11 is used to provide a signal on line 11a which is in the true state whenever at least one of the eight announce units 90 is in the READY mode, and is in the false state otherwise.

The RUN multiplexer 24 acts to pass the RUN signal from the selected one of the announce units 90 to a line 24a. An OR gate 12 is used to generate a signal on line 12a which is in the true state when any one or more of the announce units 90 are running. This signal on line 12a is inverted by the inverter 14 to produce a signal on line 14a indicative of whether or not all of the announce units 90 are stopped.

The LIMIT multiplexer 25 acts to pass the LIMIT signal from the selected one of the announce units 90 to the line 25a. An OR gate 13 is used to generate a digital signal on line 13a which indicates whether any one or more of the announce units 90 is generating a LIMIT signal.

The TONE multiplexer 26 passes the TONE signal from the selected one of the announce units 90 to line 26a.

As explained above, each of the multiplexers 21–26 receives address inputs in parallel from the same three outputs of the unit select counter 17. Thus, all of the multiplexers 21–26 will be on the same channel at any given time, corresponding to the number of the particular announce unit 90 which is active at that time.

The controller 70 includes circuitry for controlling the unit select counter 17 so as properly to activate the announce units 90 in a cyclical, sequential manner. The unit select counter 17 is provided with a RESET input and a unit advance count input. The count input is coupled to an AND gate 20 which is provided with two input signals: the Q signal from a D-type flipflop 19 and the T1 signal from a 10 Hertz, two-phase clock 1. This two-phase clock 1 generates two signals: T1 and T2. T1 is a signal with a twenty-five per cent duty cycle which is in a logic high state between phase angles of zero degrees and ninety degrees, and is in a logic low state otherwise. T2 is a second clock wave form which is in a logic high state between phase angles of 180 and 270 degrees, and in a logic low state otherwise. Thus, the two clock wave forms T1 and T2 have the same 10 Hertz frequency and are nonoverlapping. The clock wave form T1 is used to clock the D-type flipflop 19 and the clock wave form T2 is used to reset this flipflop 19. The data input of the flipflop 19 is connected to an OR gate 18 having four inputs. A logical high signal on any one of these four inputs at the appropriate point in the T1 wave form will cause the unit select counter 17 to be advanced one step. The four conditions which will cause an advance of the unit select counter 17 are described as follows:

The first such condition is the occurrence of a TONE signal on line 26a. It will be remembered that the TONE signal of the currently activated announce unit 90 is generated at the end of the message segment currently being played back. Thus, at the end of the current message segment, the TONE signal for the selected announce unit 90 changes state and is passed via the TONE multiplexer 26 and the line 26a to the OR gate 18, where it triggers an advance of the unit select counter 17 at the next occurrence of the T1 clock pulse.

The second condition which can advance the unit select counter 17 is the occurrence of a LIMIT signal on line 25a. Thus, if the selected announce unit 90 generates a LIMIT signal which is passed by the LIMIT multiplexer 25 to line 25a, this LIMIT signal operates to cause the flipflop 19 and the AND gate 20 to advance the unit select counter 17 at the next occurrence of the T1 clock pulse.

The third condition which can cause the unit select counter 17 to advance is the presence of a signal on line 9a, which is generated by an AND gate 9 when signals are simultaneously present on the two lines 5a and 8a. A one-half second delay circuit 5 operates to generate a signal on line 5a one-half second after a START signal appears on line 22a. The inverter 8 generates a signal on line 8a by inverting the signal on line 24a. Thus, if the selected one of the announce units 90 stops at any point more than one-half second after a START signal is applied via line 22a to that announce unit 90, then the AND gate 9 generates a signal on line 9a which causes the unit select counter 17 to be advanced at the next clock pulse T1. Thus, if any of the announce units 90 fails to start running when commanded to do so, or stops running without generation of a TONE signal, the controller 70 automatically advances the unit select counter 17 to the next announce unit in the cycle.

The fourth condition which can cause the unit select counter 17 to be advanced is the presence of a signal on line 10a. The READY multiplexer 23 passes the READY signal from the selected one of the announce units 90 to an inverter 10 which inverts the signal on line 10a. Thus, if the selected unit is not in the READY mode, the unit select counter 17 is advanced at the next clock pulse T1.

In summary, the unit select counter 17 is advanced to activate the next announce unit 90 in sequence whenever any one of four conditions occurs: (1) the currently selected announce unit 90 generates an end of segment TONE signal; (2) the currently selected announce unit 90 generates a LIMIT signal indicating that it has failed to complete a cycle within the predetermined time period; (3) the selected announce unit 90 fails to start on command or stops without generating a TONE signal; or (4) the selected announce unit 90 is not in the READY mode. The controller 70 operates to poll each of the announce units (which in this preferred embodiment can range up to eight in number) sequentially and to broadcast the audio signals from those announce units which are in the READY mode, which start when commanded, and which are not generating a LIMIT signal. In each case, an activated announce unit 90 is caused to play back its stored audio signal until the TONE signal is detected indicating that the message segment for the currently selected announce unit has ended. At this point, the controller 70 activates the next announce unit 90 in the sequence.

The controller 70 includes a flipflop 3 which generates a START signal on line 22a when clocked by the clock pulse T2 and an AND gate 4 indicates that three conditions have been met: (1) that the selected unit is in the READY mode, (2) that the selected unit is stopped, (3) and that an announce request signal has been received from at least one of the line interface units 60. This START signal on line 22a is applied to the enable input of the audio analog multiplexer 21 in order to cause the audio signal from the selected announce unit 90 to be passed to the amplifier 2.

The controller 70 also includes an AND gate 15 which acts to reset the unit select counter 17 whenever it detects that all announce units 90 are stopped and that no announce request signals are being received from any of the line interface units 60. This feature ensures that the next announce request signal from one of the line interface units 60 causes the first announce unit in the cycle to be activated.

The controller 70 includes means for generating two alarms. These alarms are used to control an alarm 80 to indicate an abnormal condition. The alarm 80 is sounded whenever any of the announce units 90 generates a LIMIT signal. This condition is detected by the OR gate 13 and the alarm signal is generated on line 13a. Thus, the alarm 80 is sounded if any one of the announce units 90 fails to complete a complete cycle within a predetermined period. As explained above, when five-minute continuous loop magnetic tapes are used, it is preferred that the time limit be set at approximately six minutes. Thus, if any of the announce units 90 fails to complete its cycle within six minutes after initiation of the cycle, the alarm 80 is sounded.

The second alarm condition detected by the controller 70 is a wait alarm generated by the flipflop 6. This flipflop generates an alarm on line 6a when a selected announce unit 90 is found to be in the READY mode and running prior to initiation of a START signal. This condition indicates that the selected announce unit 90 is not in position to begin broadcasting its recorded message segment immediately. Generally, this condition occurs when inadequate time is left to allow an announce unit 90 to return to its beginning of message position. For example, if five-minute magnetic tape loops are used in the announce units 90, and if the entire message is made up of three separate message segments on three separate announce units 90, each of which segments is one minute in duration, then the three message segments which combine to make up a single message take only three minutes to play back. The first announce unit 90 will not have had time to return to its beginning of message position at the time the third announce unit has completed playback of the thire message segment. In this condition, when the first announce unit is again selected, it will be found to be in the READY mode and running. This is an undesirable condition which is indicated by means of the wait alarm signal on line 6a.

Figure 2B:
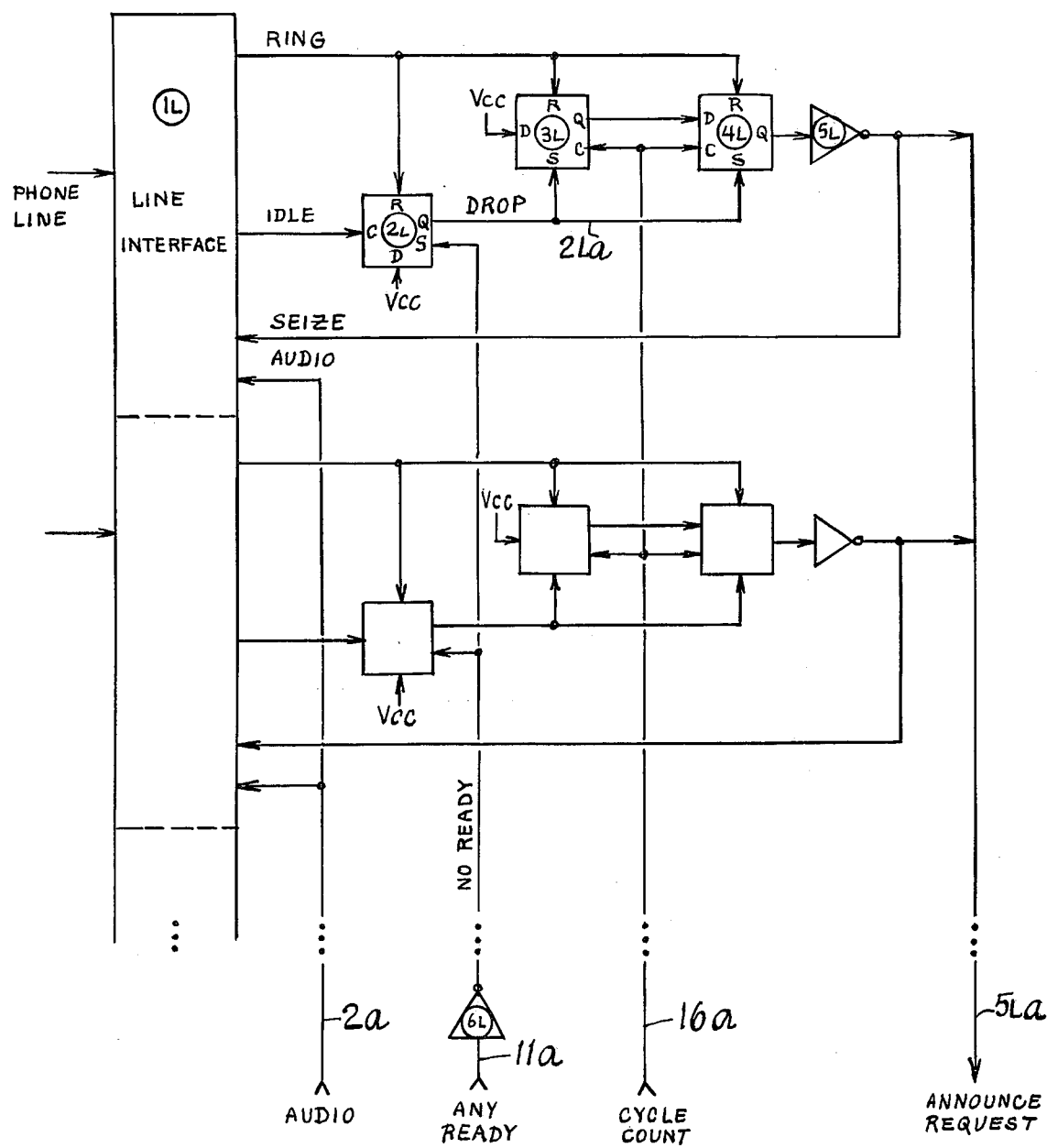
FIG. 2b is a more detailed block diagram of one of the line interface units of FIG. 1.
Figure 3:
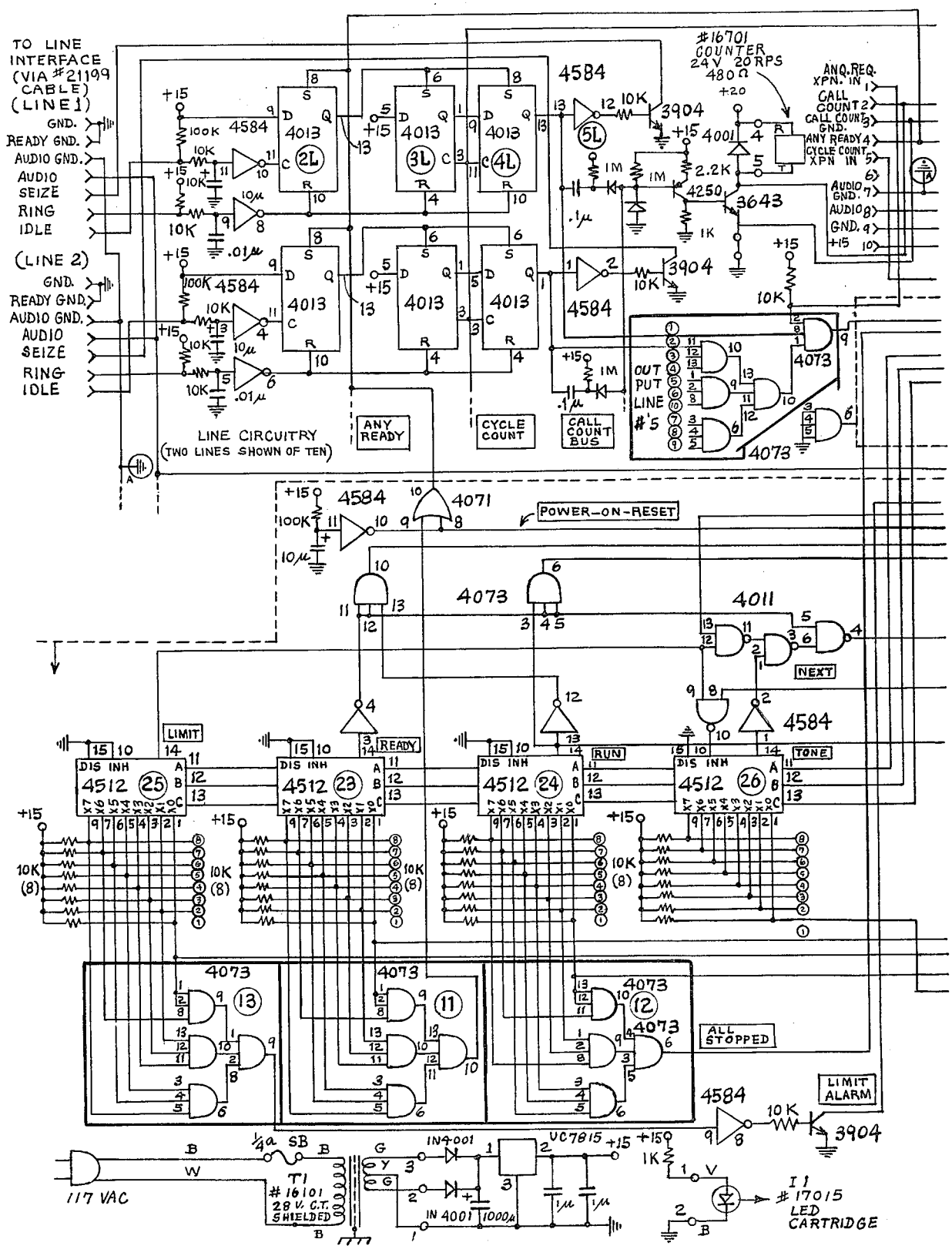
Figure 3A:
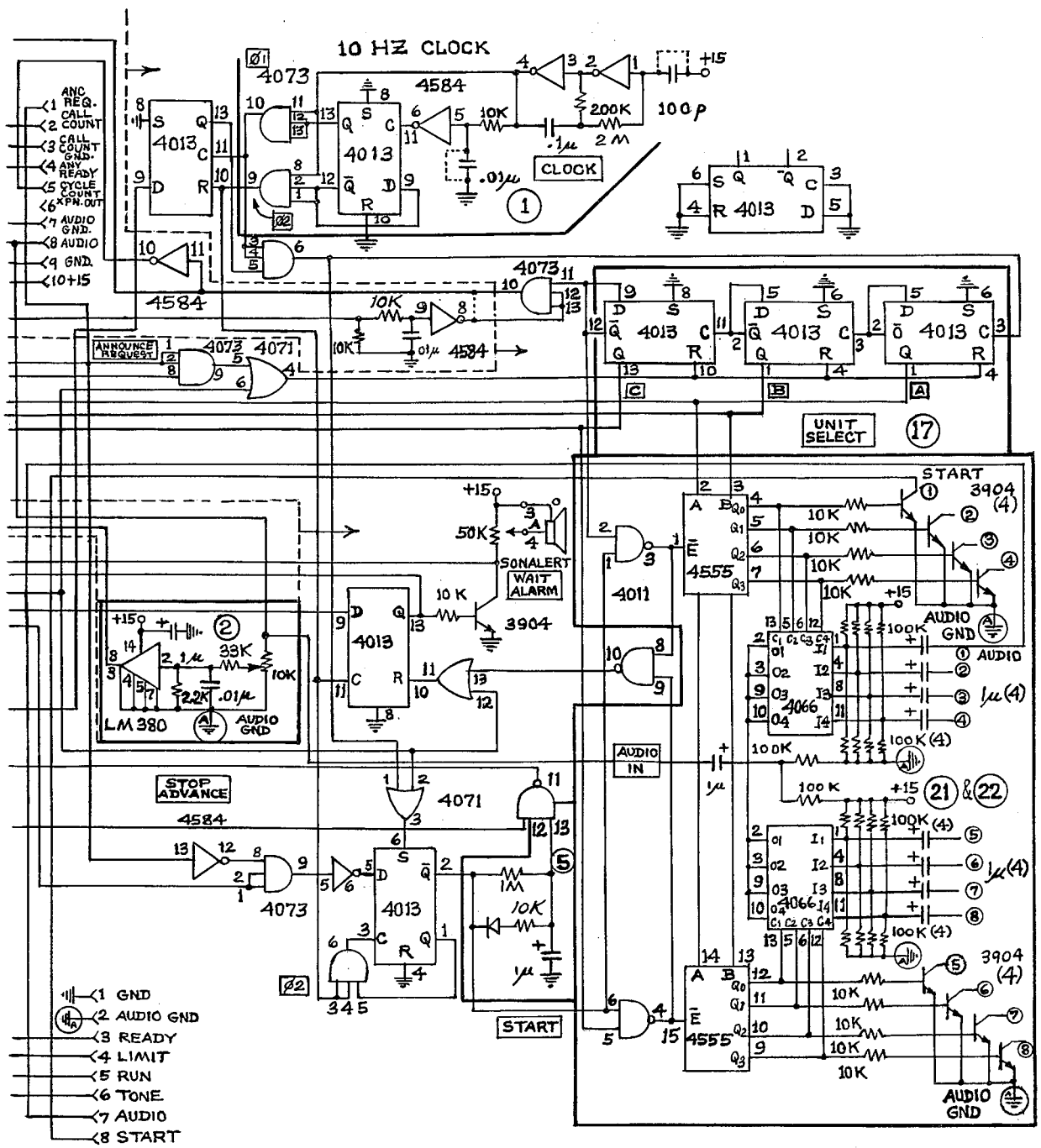

FIG. 2b is a block diagram which shows the manner in which signals are exchanged between the line interface units 60 and the controller 70. As shown in FIG. 2b, each of the line interface units 60 receives three input signals from the controller 70 and sends one output signal to the controller 70. The three input signals are the AUDIO signal, the ANY READY signal, and the CYCLE COUNT signal.

The AUDIO signal is generated by the amplifier 2 on line 2a and contains the audio message which is passed by the line interface units 60 to the respective telephone lines.

The ANY READY signal generated on line 11a by the OR gate is inverted by the inverter 6L to form a signal which indicates that no announce unit is in the READY mode. This signal is applied to the set input of the flipflop 2L and causes the flipflop 2L to generate a drop signal on line 2La. This drop signal is applied to the set inputs of two flipflops 3L,4L and causes the line interface unit 60 to drop a seized telephone line or not to respond to a ringing line. Thus, whenever none of the announce units 90 is ready to deliver a message segment, the controller 70 causes each of the line interface units 60 to drop any seized lines and prevents any ringing lines from being answered.

The CYCLE COUNT signal is generated on line 16a by the inverter 16 and corresponds to the inverted value of the most significant bit of the unit select counter 17. Thus, with every complete cycle of the most significant bit of the unit select counter 17, both flipflops 3L,4L are clocked. These flipflops 3L,4L are arranged such that the line interface unit 60 is caused to drop a seized telephone line after not more than two complete cycles of the recorded messages on the announce units 90 have been delivered to that line.

The single signal generated by the line interface units 60 which is applied as an input to the controller 70 is the ANNOUNCE REQUEST signal. When any one of the line interface units 60 has seized a telephone line, the ANNOUNCE REQUEST signal is set to indicate to the controller that message delivery is being requested for at least one telephone line.

The line interface units 60 are commonly encountered voice connect arrangements or protective connecting arrangements which do not per se form any part of this invention. Suitable line interface units may be purchased from Conversational Voice Terminal Corporation of Gurnee, Ill. Here, it is enough to understand that each line interface unit 60 is attached to a respective telephone line, that it detects to a ring signal on the line, that it includes means for seizing the line, that it includes means for passing an audio signal to the line while it is seized, that it drops the line when it receives a signal on the telephone line indicating calling party disconnect, and that it drops the line when the flipflops 3L,4L indicate that a complete delivery of the recorded message on the announce unit 90 has been made.

In operation, the system shown in the figures can be used to deliver a multisegment message to a plurality of telephone lines in a particularly flexible and useful manner. The message to be delivered is recorded on a plurality of announce units 90 as respective message segments. Each message segment is recorded in the associated announce unit 90 by placing the announce unit 90 in the RECORD mode with the mode switch 92. After the message segment has been recorded, an end of segment signal is placed on the recording medium by means of the switch 94. The announce unit 90 is then placed in the CHECK mode by means of the mode switch 92 and the recorded message segment is checked for accuracy. This is done for each of the message segments needed to make up the complete message. Once a complete set of message segments has been recorded, each of the announce units bearing these recorded message segments is placed in the READY mode by means of the mode switch 92.

When a ring signal is detected on any of the telephone lines 50, the respective line interface unit 60 operates to seize the line and to generate an ANNOUNCE REQUEST signal for the controller 70. In response to this ANNOUNCE REQUEST signal, the controller 70 activates the first announce unit 90 in the cyclical sequence. This announce unit 90 replays its recorded message segment, which is passed via the audio analog multiplexer 21 to the amplifier 2, and from the amplifier 2 to each of the line interface units 60. When the announce unit 90 completes playback of its recorded message segment, the end of segment tone on the recording medium is detected, causing the generation of a TONE signal which causes the controller 70 to advance the unit select counter 17 to the next announce unit. If this next announce unit 90 is in the READY mode, is not generating a LIMIT signal, and starts in response to a START signal, then the controller 70 causes the prerecorded message segment on this next announce unit 90 to be delivered to the amplifier 2. In this way, the complete message, which is made up of a number of separate message segments, is delivered in the proper sequence to the line interface units 60. Any of the announce units 90 which are not in the READY mode, or which are generating a LIMIT signal, or which fail to start when commanded, are automatically passed over.

This system allows individual message segments to be changed easily, without disturbing other message segments which do not need to be changed, and without interrupting the normal operation of the message delivery system. For example, if eight announce units 90 are provided and if the entire message is made up of four separate message segments, announce units U0, U2, U4, and U6 can be used as primary announce units, and announce units U1, U3, U5, and U7 can be used as backup announce units. In this arrangement, the desired message is recorded as four message segments on announce units U0, U2, U4, and U6, and then the message delivery system is placed on line, delivering the complete four-segment message to the phone lines.

While the system is operating normally, any one of the message segments can be changed easily on the associated backup announce unit, and then the backup announce unit can be substituted for the primary announce unit. For example, if it is desired to change the second message segment, then a new version of the second message segment can be recorded on announce unit U3, without disturbing the operation of announce unit U2. Once the new message segment on announce unit U3 is properly prerecorded, then announce unit U3 can be substituted for announce unit U2 merely by placing announce unit U3 in the READY mode and the announce unit U2 in the CHECK mode. Prior to this substitution, the controller 70 generates the four-part message from segments stored in announce units U0, U2, U4, and U6. After the substitution, the controller automatically generates the four-segment message from segments stored in announce units U0, U3, U4, and U6.

Alternately, a message segment can be changed merely by exchanging one tape cartridge for another while the system is operating but the particular announce unit associated with the message segment to be changed is not running. This approach is particularly useful when all of the available announce units are in use.

From these examples, it should be apparent that this system allows individual segments of the segmented message to be modified without altering other, unchanged segments, and it allows changes to be made easily and efficiently, without interrupting the normal operation of the message delivery system.

Furthermore, the segmented message approach of this message delivery system allows the construction of a system which fails in a gradual rather than a catastrophic manner. In the foregoing example in which a four-segment message is used, if one of the four announce units in the READY mode fails (as for example due to a broken belt or magnetic tape) the failed unit will automatically be bypassed by the controller, and three of the four original message segments will still be delivered. If the message segments are properly organized, this feature of the invention allows gradual and progressive reduction in the length of the delivered message rather than complete interruption of service when one of the announce units 90 fails.

Another important advantage of this system is that, because the message is segmented and stored in a plurality of announce units 90, the total message can be made much longer than that possible with only a single announce unit. For example, when five-minute tape loops are used, the system described above can be used to deliver a message as long as forty minutes. Furthermore, the system described above works well even when the length of a message segment does not correspond to the length of the magnetic tape loop. For example, if the system described above is used to deliver a six-minute message made up of three two-minute segments, and if each of the announce units is provided with a five-minute cntinuous loop tape, then the system described above will be able to begin rebroadcasting the message at the beginning of the first segment, immediately after completion of the third segment. No dead time will be needed for the first announce unit to regain the beginning of message position. This is because the first announce unit continues to run, while the second and third announce units are delivering their respective message segments, until it reaches its beginning of message position and automatically stops. Thus, the system described above does not require the length of the continuous loop tape to be changed when a seven-minute message is substituted for a six-minute message. In this way a flexible system is provided which requires less attention by the user to the correspondence between the length of the message being broadcast and the length of the cycle time for the individual announce units.

It should be understood that many changes and modifications can be made to the preferred embodiment described above. For example, the message delivery system of this invention is not limited to use with eight announce units. Rather, it can be adapted for use with either a greater or lesser number of announce units, depending on the individual application. Furthermore, the number of line interface units can readily be selected to fit the individual application. In some applications it may be desirable to have up to 100 or more separate line interface units, all controlled by the same controller 70. Moreover, this invention is not limited to use with announce units of the type employing a continuous loop magnetic tape. Rather, other types of magnetic storage media as well as digital semiconductor memory techniques can be used. It is intended that the foregoing detailed description be regarded as illustrative of the presently preferred embodiment and not as limiting. It is the following claims, including all equivalents, which are intended to define the scope of this invention.

We claim:

1. A message delivery system for repeatedly delivering a predetermined audio message to a plurality of line interface units, each of which is coupled to a respective telephone line, said message delivery system comprising:

first and second message playback units, each comprising means for generating a respective audio signal, the audio signal of the first playback unit forming a first message segment and the audio signal of the second playback unit forming a second message segment;

controller means for automatically activating the first and second message playback units in an automatically repeated sequence, such that the first playback unit is activated for a first time period and the second playback unit is activated for a second time period, immediately following the first time period;

means, included in the controller means, for supplying the audio signals of the activated playback units to the plurality of line interface units such that the audio signal of the first playback unit is supplied to the interface units during the first time period and the audio signal of the second playback unit is supplied to the interface units during the second time period, and the first and second message segments formed by the respective audio signals make up the predetermined message.

2. The invention of claim 1 wherein each of the playback units comprises an endless loop magnetic tape.

3. The invention of claim 1 further comprising a third message playback unit coupled to the controller means.

4. The invention of claim 1 wherein the controller means further comprises means for generating an alarm signal in response to a failure of one of the message playback units.

5. The invention of claim 1 wherein each of the message segments comprises at least one sentence.

6. The invention of claim 1 wherein the controller means automatically operates to activate the playback units repeatedly in sequence, wherein each of the playback units includes a respective recording medium having a beginning of message segment position, and wherein the controller means includes means for generating an alarm signal when the recording medium of one of the playback units is not at the beginning of message segment position when the respective playback unit is selected to initiate generation of the respective audio signal.

7. A message delivery system for delivering an audio message to a plurality of line interface units, each of which is coupled to a respective telephone line, said message delivery system comprising:
   a plurality of message playback units, each comprising means for generating a respective audio signal indicative of a respective message segment from a respective storage medium;
   means for designating a subset of the playback units as in a ready mode;
   means for cyclically activating in sequence only the subset of the playback units which are in the ready mode and for supplying the audio signals of the activated playback units to the interface units such that each of the subset of the playback units delivers a respective message segment to the interface units in sequence;
   said playback units adapted to allow the storage media of the playback units not included in the subset to be modified to alter the respective message segment without interrupting delivery of message segments from the subset of the playback units to the interface units.

8. The invention of claim 7 wherein each of the storage media comprises a respective loop of magnetic tape.

9. The invention of claim 7 wherein each of the playback units comprises means for generating an end of segment signal at the end of the respective message segment, and wherein the activating means comprises means, responsive to the end of segment signals, for automatically activating a next playback unit included in the subset in response to detection of the end of segment signal from a currently activated playback unit.

10. The invention of claim 9 wherein each of the means for generating the end of segment signal includes means for detecting an audio end of segment tone on the respective recording medium.

11. The invention of claim 9 wherein each of the message segments comprises at least one sentence.

12. The invention of claim 7 further comprising means for generating an alarm signal in response to a failure of one of the playback units.

13. The invention of claim 7 wherein each of the playback units automatically operates for a period of time after being activated in order to return the respective recording medium to a beginning of message segment position, and wherein the invention further comprises means for generating an alarm signal when one of the playback units is operating at the time it is selected to initiate generation of the respective message segment.

14. A message delivery system for delivering a predetermined audio message to a plurality of line interface units, each of which is coupled to a respective telephone line, said system comprising:
   a plurality of endless loop magnetic tape playback units, each comprising means for generating during playback a respective audio signal forming a respective message segment, each audio signal terminating with a respective end of message segment signal;
   means, included in each of the playback units, for generating a respective ready signal when the associated playback unit is in a ready mode;
   controller means, coupled to the playback units, for automatically, repeatedly, and cyclically activating the playback units in sequence;
   means, included in the controller, for automatically terminating playback of a currently activated one of the playback units in response to the respective end of message segment signal and for then immediately automatically activating a next one of the playback units in a predetermined sequence in response to the respective ready signal, such that only those ones of the playback units which are in the ready mode are activated in the predetermined sequence and those ones of the playback units which are not in the ready mode are not activated; and
   means, included in the controller means, for supplying the audio signals of the activated playback units to the plurality of line interface units such that the message segments of the activated playback units are supplied in sequence to the line interface units so as to make up a predetermined composite message.

15. The invention of claim 14 wherein each of the message segments comprises at least one sentence.

16. The invention of claim 14 wherein each of the playback units automatically operates for a period of time after being activated in order to return the respective recording loop to a beginning of message segment position, and wherein the invention further comprises means for generating an alarm signal when one of the playback units is operating at the time it is selected to initiate generation of the respective message segment.

* * * * *